March 6, 1962
T. P. McCONVILLE
3,024,114
PROCESS OF PREPARING FISH FOR CANNING
Filed Oct. 27, 1958
2 Sheets-Sheet 2
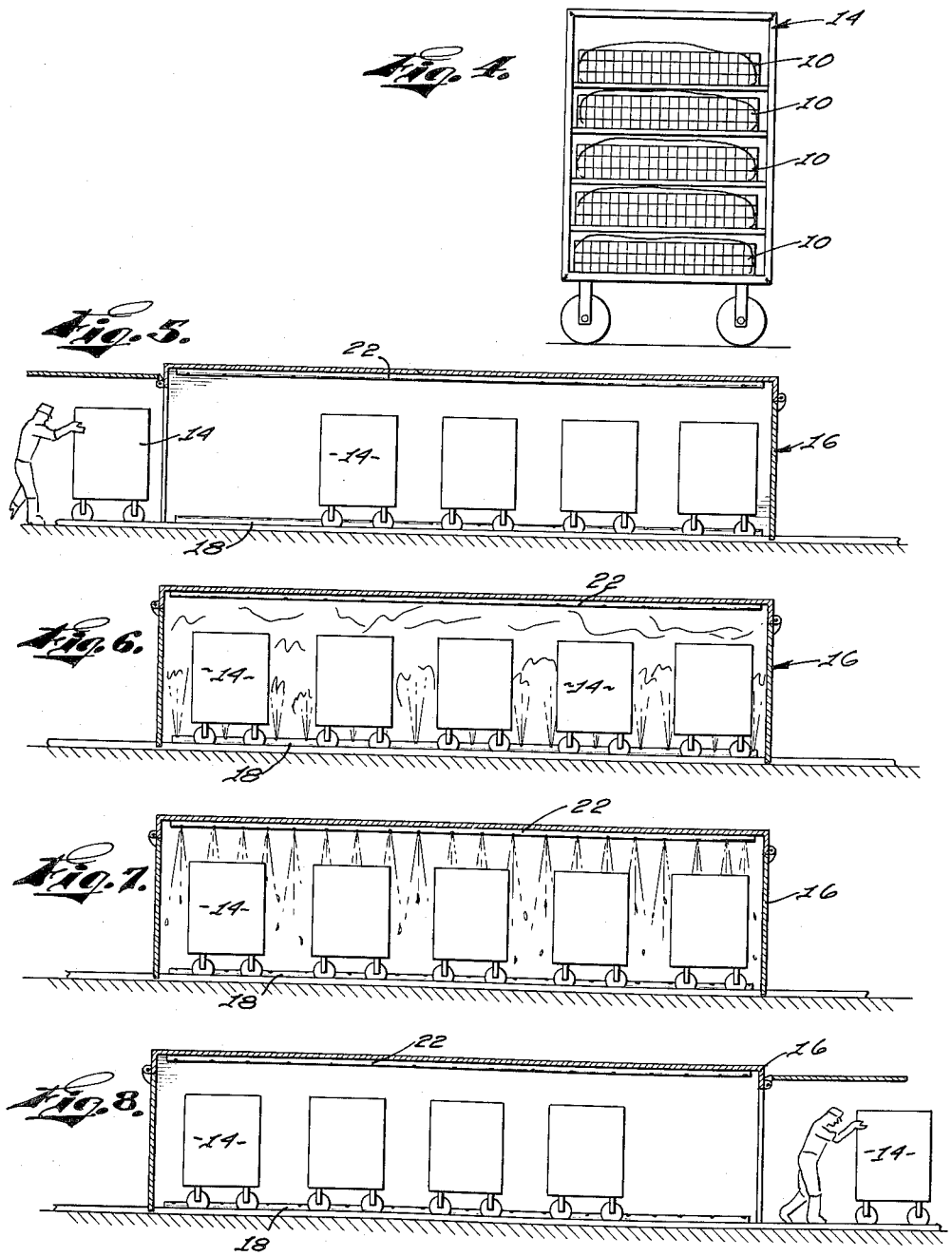
INVENTOR.
Thomas P. McConville
BY Fulwider, Mattingly & Huntley
Attorneys

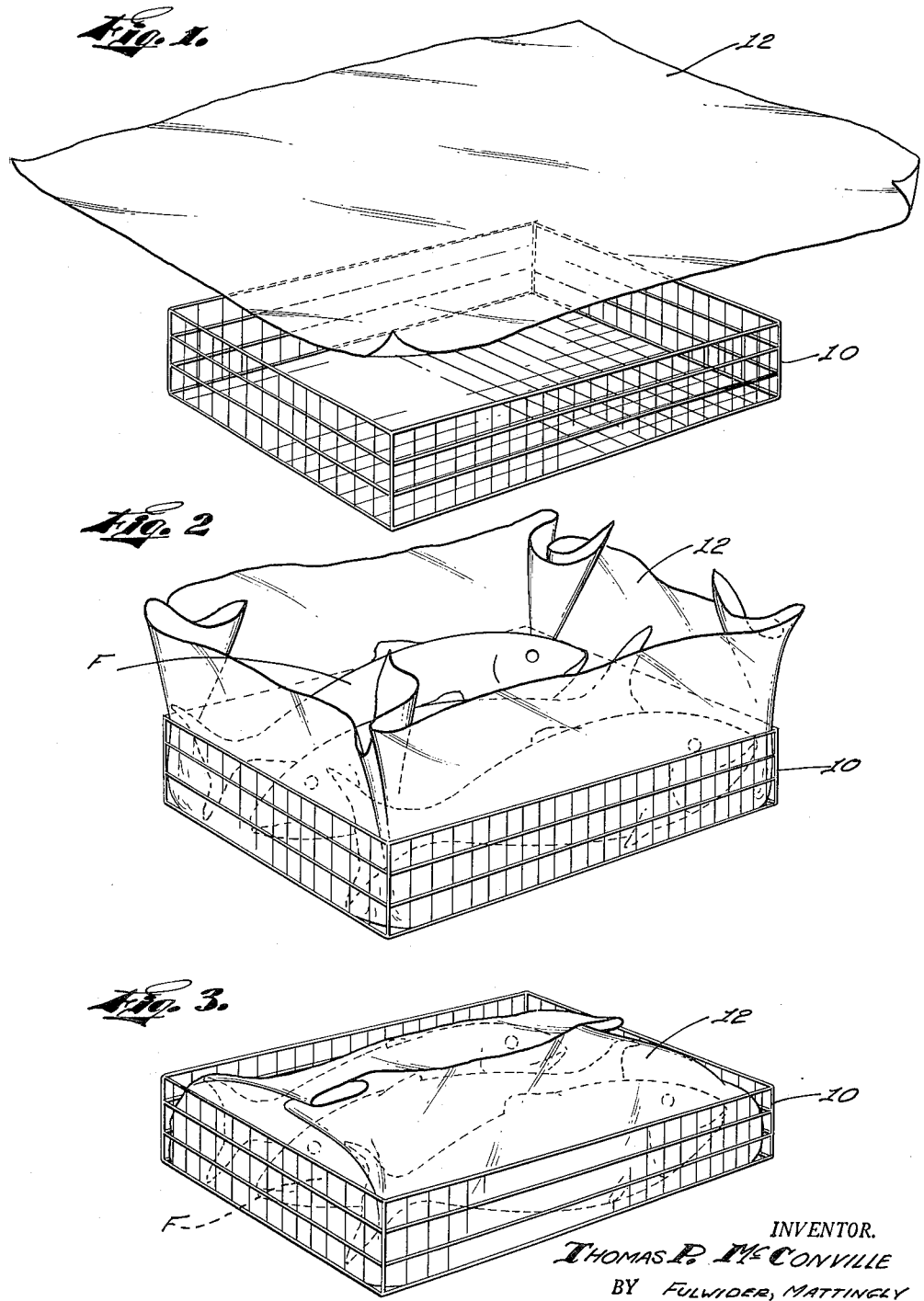

United States Patent Office 3,024,114
Patented Mar. 6, 1962

3,024,114
PROCESS OF PREPARING FISH FOR CANNING
Thomas P. McConville, Garden Grove, Calif., assignor to South Coast Fisheries, Inc., Terminal Island, Calif., a corporation of California
Filed Oct. 27, 1958, Ser. No. 769,711
5 Claims. (Cl. 99—111)

The present invention relates generally to the fish canning industry and more particularly to a new and novel process of precooking and cooling tuna type fish preparatory to canning.

Generally, the conventional tuna canning plant is located adjacent a fish unloading dock. If the fish, upon being unloaded, are not completely thawed, such thawing is effected, and, thereafter, the fish are eviscerated. After evisceration, the fish are disposed within wire baskets and the latter are loaded onto wheeled racks. The basket-loaded racks are then moved into a steam autoclave that constitutes a precooking oven. The precooking oven is generally of rectangular shape and has a capacity of several racks. During a precooking operation, sufficient steam is admitted to the precooking oven so as to maintain it at a temperature of between 212 and 220 degrees F. At the conclusion of the precooking operation, the racks are moved out of the precooking oven whereby the fish may be cooled. The cooling operation generally takes place within a cooling room that is open to the atmosphere, with the fish remaining within the cooling room until their temperature has been sufficiently reduced that they may undergo cleaning. The fish cleaning operation is accomplished by manual labor and requires that the head, skin and fins first be removed. The body of the fish is then split and the backbone removed, with each half being again split longitudinally and the dark meat carefully scraped away. The remaining light meat is preferred for human consumption and is packed in cans by hand or by mechanical means.

The aforedescribed conventional method of precooking and cooling tuna-type fish preparatory to canning gives rise to certain serious disadvantages. During the precooking operation the fish's cell structure expands and the natural fish juices undergo excessive evaporation. This excessive evaporation results in a decrease in the weight and, hence, the ultimate yield realized from the fish. Inasmuch as the cost of the raw fish represents a major portion of the total cost of the canning operation, this is an important consideration. Additionally, it has been found that the direct contact of the atmosphere (and hence oxygen) or a mixture of the atmosphere and steam with the meat of the fish during precooking causes a darkening of this meat. Although the meat of all of the fish being precooked is darkened to a greater or lesser degree, certain of the fish often become so exceedingly dark as to be relegated for use as the comparatively low-cost grated style canned meat, or even pet food. In this regard, it should be noted that only the lighter meat can be utilized in the highly desirable solid or chunk style canned meat that brings the highest price. During the aforedescribed cooling operation, the contact of the meat with the air results in further darkening of this meat. As noted above, since it is important that the meat to be canned is of a light color, such discoloration must be removed by hand scraping. Additionally, during such cooling operation, the natural fish juices undergo evaporative loss so as to further reduce the weight of the meat and thus the ultimate yield. It will, therefore, be appreciated that the conventional method of precooking and cooling tuna preparatory to canning is both inefficient and costly.

It is a major object of the present invention to eliminate the disadvantages reuslting from the conventional manner of precooking and cooling tuna type fish preparatory to canning.

Another object of the invention is to provide a process of preparing fish for canning which appreciably raises the yield of usable meat as compared to existing processes of this nature.

Yet a further object of the invention is to provide a precooking process wherein the fish are wrapped in a semi-permeable film prior to the precooking operation with such film restricting evaporation of the natural fish juices during the precooking operation, while restraining direct contact of oxygen or steam with the fish meat, such film further permitting the escape of the gases naturally present within the meat, the escape of such gases being necessary in order to prevent the canned meat from having an undesirable taste and odor.

Yet another object of the invention is to provide a process of the aforedescribed nature which may be carried out with existing precooking equipment after effecting minor and comparatively inexpensive modifications of such equipment.

An additional object is to provide a process of the aforedescribed nature which appreciably increases the yield of light colored meat as compared to existing processes.

It is yet a further object of the present invention to provide a process of the aforedescribed nature which permits the precooking and cooling operation to be more accurately scheduled to the needs of the cleaning and packing room personnel. This is accomplished by introducing water into the precooking oven after the precooking step so as to effect rapid cooling of the meat.

These and other objects and advantages of the present invention will become apparent from the following detailed description, when taken in conjunction with the appended drawings wherein:

FIGURES 1, 2 and 3 are perspective views showing how fish are wrapped in a semi-permeable film preparatory to a precooking operation conducted in accordance with the present invention;

FIGURE 4 is an enlarged side elevational view showing the fish-containing baskets and a rack employed in carrying out the process of the present invention;

FIGURE 5 is a side view showing how the precooking oven is loaded with a plurality of said racks;

FIGURE 6 is a side view similar to FIGURE 5 showing the precooking step of a process embodying the present invention;

FIGURE 7 is a side view similar to FIGURE 5 showing how the fish may be cooled after such precooking step; and FIGURE 8 is a side view similar to FIGURE 5 showing the manner in which the precooked and cooled fish are removed from the precooking oven.

Referring to the drawings and particularly FIGURES 1, 2 and 3 thereof, tuna type fish are in the practice of the present invention precooked in conventional open-topped wire precooking baskets 10. The baskets 10 are each provided with a sheet of semi-permeable film 12 having greater dimensions than the basket whereby the sides and ends of the sheet will overlap the upper edges of the basket when such sheets are placed therein, as indicated in FIGURE 2. In the practice, it has been found that various synethetic plastic materials may be employed for such sheets 10. Polyethylene has proven to be especially satisfactory while polystyrene, cellophane, Pliofilm and Saran have also been utilized. It is essential that such film be substantially moisture-proof, yet it is desirable that certain gases be able to freely pass through the pores of the film for reasons to be fully set forth hereinafter. Referring again to FIGURE 2, after the film 12 has been placed within the basket 10, one or more fish F are deposited within the confines of the film. Thereafter, as indicated in FIGURE 3, the overlapping portions of the film extending above the upper edges of the basket are folded inwardly over the top of the fish F. Preferably, these overlapping flaps are not sealed but merely abut one another.

Referring now to FIGURE 4, a plurality of the fish-receiving baskets 10 are loaded upon a wheeled rack 14. These racks 14 are likewise of conventional construction and are found at existing tuna canning plants. Referring now to FIGURE 5, the loaded racks 14 are then moved into a precooking oven 16. This precooking oven is of generally conventional construction and is provided wtih steam nozzles 18. When all of the loaded racks have been moved into the oven, the doors thereof are closed and steam is admitted through the nozzles 18, as indicated in FIGURE 6. The admission of such steam raises the temperature within the oven 16 to between 212 to 220 degrees F. The time required for the precooking step will vary in accordance with the size and quantity of the fish being processed. Generally, however, this time will vary between three to ten hours.

It should be particularly observed that during this precooking operation the semi-permeable film 12 will restrain direct contact of the atmosphere (and hence oxygen) or a mixture of the atmosphere and steam within the oven 16 with the fish meat. Accordingly, the discoloration which normally results from such contact during the conventional precooking operation will be prevented. Additionally, it should be noted that the film 12 will restrain the unrestricted evaporation of the natural fish juices which takes place in a conventional precooking operation. It is essential, however, that the film 12 passes the gases naturally present within the fish and released during the cooking thereof. Unless such gases are permitted to escape the meat will take on a disagreeable odor and taste which would render it undesirable for human consumption. It is well-known that certain synthetic plastics, as represented by the aforementioned examples, can be so compounded and treated as to be selective with respect to the rate of flow of various gases through the pores of the plastic. Accordingly, although the film 12 will restrict the inward flow of oxygen, it will permit relatively free outward flow of the gases naturally present within the fish, e.g. carbon dioxide, ammonia, etc.

Referring now to FIGURE 7, at the conclusion of the precooking step, water is admitted to the interior of the precooking oven 16 by means of water nozzles 22. The introduction of such water will effect rapid cooling of the precooked fish. During this cooling step, the film 12 will restrain evaporation of the moisture present within the fish meat while continuing to restrict direct contact of oxygen with the fish meat. Additionally, the film 12 will prevent the meat from soaking up any of the water introduced into the precooking oven 16. When the temperature of the fish has been reduced to the point that they may undergo manual handling the racks 14 are wheeled out of the precooking oven. The time required for cooling the fish to the desired temperature will, of course, vary with the size and weight of the fish being processed, as well as the quantity and the temperature of the water admitted into the precooking oven. These conditions will vary from one tuna plant to another and from day to day within an individual plant. It is possible, however, by controlling the quantity and temperature of the cooling water to schedule the completion of the cooling step to meet the needs of the cleaning and packing room personnel.

While the aforedescribed manner of cooling the precooked fish is preferable, it is possible to effect the cooling step in a conventional manner. If this is desired at the conclusion of the precooking step the oven 16 will be opened and the racks 14 wheeled to the conventional cooling room. During the cooling step the film 12 will restrain evaporation of the moisture present within the fish meat while restricting direct contact of oxygen with such meat. In this manner the yield of light colored meat will be considerably increased as compared to the usual cooling operation.

After the racks 14 have been removed from the oven 16, the fish F will be removed from the film 12. It should be particularly noted that the utilization of the film 12 will eliminate any sticking of the meat to the wire baskets 10. Accordingly, none of the meat will be lost as would be the case where such film was not utilized. Additionally, the job of cleaning the baskets 10 for subsequent use is made far easier than would be the case if such film were not employed. The fish meat separates readily from the film 12. Another important advantage of the process of the present invention is that it facilitates cleaning of the precooked fish. In this regard the mucilaginous material between the meat and the skin does not harden as when the fish is precooked conventionally. Accordingly, the skin may be readily caused to part from the meat. Moreover, the light colored meat will separate from the darker meat more readily than where normal precooking methods are employed. This results in a further savings of labor.

It should be noted that the process of the present invention was particularly developed for use in canning fish of the tuna family, i.e. tuna, albacore, bluefin, yellowtail, yellowfin, bonito and skipjack. Accordingly, wherever the term "fish" is utilized herein, this term should be understood as including each of these types of fish. It should likewise be noted that various modifications and changes may be made with respect to the foregoing detailed description without departing from the spirit of the invention or the scope of the following claims.

I claim:

1. A process of preparing tuna type fish for canning, that includes wrapping said fish in a moisture-proof, gas permeable film without sealing said film, said film being wrapped about said fish with its overlapping portions merely abutting one another and with such edges being free of the weight of said fish; precooking said fish while so wrapped by directly exposing said film-wrapped fish to steam whereby the gases normally present in the fish are released during the cooking operation, and then cooling said fish while so wrapped.

2. A process of preparing tuna type fish for canning, that includes wrapping said fish in a moisture-proof, gas-permeable film without sealing said film, said film being wrapped about said fish with its overlapping portions merely abutting one another and with such edges being free of the weight of said fish; precooking said fish while so wrapped by directly exposing said film-wrapped fish to steam whereby the gases normally present in the fish are released during the cooking operation, and after said precooking exposing said fish while wrapped to a cooling fluid.

3. A process of preparing tuna type fish for canning, that includes wrapping said fish in a moisture-proof, gas-permeable film without sealing said film, said film being wrapped about said fish with its overlapping portions merely abutting one another and with such edges being free of the weight of said fish; disposing said wrapped fish in a steam-containing precooking zone for a time required to effect precooking of said fish whereby the gases normally present in the fish are released during the cooking operation, removing the steam from said zone and exposing said wrapped fish to a cooling fluid while said fish are still within said precooking zone.

4. A process of preparing tuna type fish for canning, that includes wrapping said fish in a moisture-proof, gas-permeable film without sealing said film, said film being wrapped about said fish with its overlapping portions merely abutting one another and with such edges being free of the weight of said fish; disposing said wrapped fish in a steam-containing precooking zone for a time required to effect precooking of said fish whereby the gases normally present in the fish are released during the cooking operation, removing the steam from said zone and spraying said wrapped fish with water while said fish are still within said precooking zone.

5. A process for preparing tuna type fish for canning, that includes providing an open-top container for said fish, disposing a sheet of moisture-proof, gas-permeable film having greater dimensions than said container in said container with the sides and ends of said film overlapping the upper edges of said container, depositing said fish within the confines of said container, folding the overlapping portions of said film over the top of said fish with said portions abutting one another but not being sealed, disposing said fish in a steam-containing precooking zone for a time required to effect precooking of said fish whereby the gases normally present in the fish are released during the cooking operation, removing the steam from said zone and exposing said wrapped fish to a cooling fluid while said fish are still within said precooking zone.

References Cited in the file of this patent

UNITED STATES PATENTS

| | | |
|---|---|---|
| 1,146,709 | Hugh | July 13, 1915 |
| 1,229,555 | Warner | June 12, 1917 |
| 2,398,082 | Cavallito | Apr. 9, 1946 |
| 2,635,050 | Stevenson et al. | Apr. 14, 1953 |
| 2,919,987 | Erickson et al. | Jan. 5, 1960 |

OTHER REFERENCES

"Refrigerating Engineering," February 1954, page 46, article entitled Packaging And Wrapping Materials.